United States Patent [19]
Bishoff et al.

[11] Patent Number: 6,016,625
[45] Date of Patent: Jan. 25, 2000

[54] METHODS AND APPARATUSES FOR MONITORING OR CONTROLLING PESTS

[76] Inventors: Michael J. Bishoff, 211 W. Rowan Ct., Westfield, Ind. 46074; Dennis G. Wujek, 9970 Oak Ridge Dr., Zionsville, Ind. 46077; Thomas F. Linnen, Jr., 8348 Courtney Dr., Fishers, Ind. 46038; Gregory A. Lyon, 8927 Serpent Cir., Indianapolis, Ind. 46236; Tetsuo Matsumoto, 1-23-56 Minamimaioka, Yokohama, Japan; A. Sterett Robertson, 11967 W. 400 N., Thorntown, Ind. 46071

[21] Appl. No.: 09/060,578

[22] Filed: Apr. 15, 1998

Related U.S. Application Data
[60] Provisional application No. 60/043,952, Apr. 15, 1997.

[51] Int. Cl.[7] .............................. A01M 1/10; A01M 1/02
[52] U.S. Cl. ............................................... 43/121; 43/107
[58] Field of Search ......................... 43/121, 131, 132.1, 43/109, 107, 124; 52/101

[56] References Cited

U.S. PATENT DOCUMENTS

| | | |
|---|---|---|
| 479,980 | 8/1892 | Gordon ..................................... 43/109 |
| 1,013,514 | 1/1912 | Rand . |
| 1,042,350 | 10/1912 | Horstmann ................................ 43/107 |
| 2,837,861 | 6/1958 | Graham, Sr. .............................. 43/131 |

(List continued on next page.)

FOREIGN PATENT DOCUMENTS

| | | | |
|---|---|---|---|
| 503403 | 9/1979 | Australia ....................... A01N 17/14 |
| 503416 | 9/1979 | Australia ....................... A01N 17/14 |
| 0069879 | 1/1983 | European Pat. Off. ....... A01N 25/00 |
| 0587116A1 | 3/1994 | European Pat. Off. ......... A01M 1/20 |
| 0587117A1 | 3/1994 | European Pat. Off. ....... A01N 25/00 |
| H026787 | 2/1990 | Japan .............................. A01M 1/00 |
| 1319401 | 3/1990 | Japan ............................. A01N 25/00 |
| 1319401 | 4/1990 | Japan ............................. A01N 25/00 |
| 3-31683 | 5/1991 | Japan ............................. A01N 25/00 |
| H0348162 | 7/1991 | Japan ............................. A01N 25/12 |
| 4-21449 | 4/1992 | Japan .............................. A01M 1/00 |
| 1561901 | 3/1980 | United Kingdom ........... A01N 25/00 |
| 1597293 | 9/1981 | United Kingdom ........... A01N 25/00 |
| 2202123 | 9/1988 | United Kingdom ..................... 43/121 |
| WO9100007 | 1/1991 | WIPO ............................ A01N 25/00 |
| WO 93/23998 | 12/1993 | WIPO ............................ A01N 25/00 |
| WO9404034 | 3/1994 | WIPO ............................ A01N 63/04 |
| WO 96/32009 | 10/1996 | WIPO ............................. A01M 1/00 |

OTHER PUBLICATIONS

"In our never–ending quest to improve termite control, we finally hit the wall."; FMC Corporation, 1996; Single Sheet.

"Now, a new weapon for fighting termites at the source."; FMC Corporation, Jun. 1996; Copy of pamphlet—Two Sheets.

"Now, you can really have termites up against the wall."; FMC Corporation, Jun. 1996; Copy of pamphlet—Two Sheets.

"The FirstLine™ Termite Bait Station"; FMC Corporation, Jun. 1996; Tech Update—Single Sheet (double sided).

Beard; "Termite Biology & Bait–block method of control"; The Connecticut Agricultural Experiment Station, New Haven; Bulletin 748; Nov., 1974; pp. 3–19.

(List continued on next page.)

*Primary Examiner*—Michael J. Carone
*Assistant Examiner*—Son T. Nguyen
*Attorney, Agent, or Firm*—Kenneth L. Loertscher

[57] ABSTRACT

An apparatus and methods for monitoring and/or controlling pests, particularly termites. The apparatus employ one or more extractor means for selectively moving termite monitoring and/or termite baiting devices. Stations used for the monitoring or control of termites are comprised of a housing that contains combinations of stacked termite monitoring and/or termite baiting devices and one or more extractor means for selectively moving the monitoring and/or baiting devices. Another embodiment optionally includes a cup for holding the termite monitoring or termite baiting devices.

45 Claims, 4 Drawing Sheets

U.S. PATENT DOCUMENTS

| | | | |
|---|---|---|---|
| 3,017,717 | 1/1962 | Caubre | 43/131 |
| 3,624,953 | 12/1971 | Crosby | 43/131 |
| 3,858,346 | 1/1975 | Bailey | 43/124 |
| 3,906,656 | 9/1975 | Burke et al. | 43/131 |
| 3,940,875 | 3/1976 | Basile | 43/124 |
| 3,972,993 | 8/1976 | Kobayashi et al. | 424/15 |
| 4,043,073 | 8/1977 | Basile | 43/124 |
| 4,626,528 | 12/1986 | McHenry | 514/119 |
| 4,747,230 | 5/1988 | Zalesky | 43/121 |
| 4,782,622 | 11/1988 | Roberts | 43/131 |
| 4,930,251 | 6/1990 | Crisanti | 43/107 |
| 4,945,673 | 8/1990 | Lavelle | 43/124 |
| 5,018,299 | 5/1991 | Peek | 43/107 |
| 5,027,546 | 7/1991 | Tallon | 43/124 |
| 5,042,192 | 8/1991 | Osteen | 43/109 |
| 5,048,224 | 9/1991 | Frisch | 43/114 |
| 5,057,315 | 10/1991 | Gunner et al. | 424/93 |
| 5,057,316 | 10/1991 | Gunner et al. | 424/93 |
| 5,151,443 | 9/1992 | Henrick | 514/486 |
| 5,329,726 | 7/1994 | Thome et al. | 43/124 |
| 5,555,672 | 9/1996 | Thorne et al. | 43/124 |
| 5,573,760 | 11/1996 | Thorne et al. | 424/84 |
| 5,609,879 | 3/1997 | Myles | 424/410 |
| 5,749,168 | 5/1998 | Chrysanthis | 43/122 |
| 5,901,496 | 5/1999 | Woodruff | 43/124 |
| 5,907,923 | 6/1999 | Heath et al. | 43/122 |

OTHER PUBLICATIONS

Esenther et al.; "Subterreanean Termite Studies in Southern Ontario"; The Canadian Entomologist; vol. 100; Aug. 1968; pp. 827–834.

Esenther et al.,; "Attractant–Mirex Bait Suppresses Activity of Reticulitermes"; Journal of Economic Entomology, vol. 67, No. 1; Feb., 1974; pp. 85–88.

Esenther et al.; "Insecticidal Baits on Field Plot Perimeters Suppress Reticulitermes"; J. Econ. Entomol. 71 (4): 604–607 (Aug. 1978).

Ettershank et al.; "Location of Food Sources by Subterranean Termites"; Enviorn. Entomol. 9 (5): 645–648 (Oct. 1980).

Ewart; "Direct Colony Baiting of Termite Colonies: A Tool for Ecological Studies;" Proceeding of the Symposium on Current Research on Wood–Destroying Organisms and Future Prospects for Protecting Wood in Use, United States Department of Agriculture; May, 1991; pp. 38–42.

French et al.; "Baits for Aggregating Large Numbers of Subterranean Termites"; J. Aust. ent. Soc. 1981, 20: 75–76.

French et al.; "Baiting techniques for subterranean termite control", The International Research Group on Wood Preservation, May, 1983, pp. 1–3.

French et al.; "A Technique Used on Mounds of *Coptotermes Lacteus* to Screen Potential Bait Substrates"; J. Aust. ent. Soc., 1985, 24: 111–112.

French; "Baiting Techniques for Control of Coptotermes Species Within Existing Buildings in Australia"; Proceedings of the Symposium on Current Research on Wood–Destroying Organisms and Future Prospects for Protecting Wood in Use, United States Department of Agriculture, May, 1991; pp. 46–50.

French; "How Do We Advise the Pest Control Industry in the Post–Organochlorine Era?"; Proceedings of the Symposium on Current Research on Wood–Destroying Organisms and Future Prospects for Protecting Wood in Use, United States Department of Agriculture, May, 1991; pp. 58–62.

Frishman et al., "Proper Chemical Dispersion Key to Termite Control"; Pest Control Technology, Apr. 1988, pp. 33–36.

Frishman et al.; "Rodding is a Tricky Business"; Pest Control, Aug. 1991, pp. 48–56.

Grace et al.; "Eastern Subterranean Termite (Isoptera: Rhinotermitidae) Foraging Territories And Populations in Toronto"; Can. Ent. 121:551–556 (Jul. 1989).

Grace; "Behavioral Ecology of Subterranean Termites and Implications for Control"; Proceedings of the Symposium on Current Research on Wood–Destroying Organisms and Future Prospects for Protecting Wood in Use, United States Department of Agriculture, May, 1991; pp. 43–45.

Jones; "Evaluation of Two Insect Growth Regulators for the Bait–Block Method of Subterranean Termite (Isoptera: Rhinotermitidae) Control"; J. Econ. Entomol, 77 (5): 1086–1091 (Oct. 1984).

Jones; "Field evaluation of several bait toxicants for subterranean termite control: a preliminary report"; The International Research Group on Wood Preservation; Apr. 25, 1988; pp. 1–11.

Mauldin et al.; "Soil termiticides: A review of efficacy data from field tests"; The International Research Group on Wood Preservation; May 31, 1987; pp. 1–19.

Oloo; "Some Observations on the Trail–Laying Behaviour of *Macrotermes michaelseni* (Sjost) (Termitidae)"; Insect Sci. Applic., vol. 5, No. 4, pp. 259–262, 1984.

Ostaff et al; "Termite (Isoptera) Suppression with Toxic Baits"; Can. Ent. 107: 1321–1325 (Dec. 1975).

Paton et al.; "Control of *Mastotermes darwiniensis* Froggatt (Isoptera: Mastotermitidae) with Mirex Baits"; Australian Forest Research 10: 249–258 (1980).

Spragg et al.; "Tracing, Trophallaxis and Population Measurement of Colonies of Subterranean Termites (Isoptera) Using a Radioactive Tracer"; Ann. Entomol. Soc. Am. 73 (6): 708–714 (Nov. 1980).

Su et al.; "Effects of a Dye, Sudan Red 7B, on the Formosan Subterranean Termite, *Coptotermes formosanus* Shiraki (Isoptera: Rhinotermitidae)"; Mate. und Org. 18: 127–133; 1983.

Su et al.; "Oral toxicity of a slow–acting insecticide Amdro® to the Formosan subterranean termite"; The International Research Group on Wood Preservation; May 10, 1982; pp. 1–5.

Su et al.; "Trials on the field control of the Formosan subterranean termite with Amdro® bait", The International Research Group on Wood Preservation; May 10, 1982; pp. 1–10.

Su et al., "Effect of Behavior on the Evaluation of Insecticides for Prevention of or Remedial Control of the Formosan Subterranean Termite"; J. Econ. Entomol.; vol. 75(2); Apr. 1982; pp. 188–193.

Su et al.; "A Dye, Sudan Red 7B, as a Marking Material for Foraging Studies with the Formosan Subterranean Termite"; Sociobiology, vol. 8 (No. 2) 1983; 91–97.

Su et al.; "Comparisons of Laboratory Methods for Estimating Wood Consumption Rates by *Coptotermes formosanus* (Isoptera: Rhinotermitidae)"; Annals of the Entomological Society of America, vol. 77, No. 2, Mar. 1984, pp. 125–129.

Su et al.; "Foraging Behavior of the Formosan Subterranean Termite (Isoptera: Rhinotermitidae)"; Environ. Entomol. 13 (6): 1466–1470 (Dec. 1984).

Su et al.; "Differences in survival and feeding activity among colonies of the Formosan subterranean termite (Isoptera, Rhinotermitidae)"; Z. ang. Ent. 97; 1984, pp. 134–139.

Su et al.; "Effects of Three Insect Growth Regulators, Feeding Substrates, and Colony Origin on Survival and Presoldier Production of the Formosan Subterranean Termite (Isoptera: Rhinotermitidae)"; Journal of Economic Entomology, vol. 78, No. 6, Dec. 1985; pp. 1259–1263.

Su et al.; "Wood–Consumption Rate and Survival of the Formosan Subterranean Termite (Isoptera: Rhinotermitidae) when Fed One of Six Woods Used Commercially in Hawaii"; Proceedings, Hawaiian Entomological Society, vol. 26, Mar. 1, 1986, pp. 109–114.

Su et al.; "Effects of Starvation on Survival and Maintenance of Soldier Proportion in Laboratory Groups of the Formosan Subterranean Termite, Coptotermes formosanus (Isoptera: Rhinotermitidae)"; Ann. Entomol. Soc. Am. 79 (2); 312–316 (Mar. 1986).

Su et al.; "Field Comparison of Sulfuryl Fluoride Susceptibility Among Three Termite Species (Isoptera: Kalotermitidae, Rhinotermitidae) During Structural Fumigation"; J. Econ. Entomol. 79 (4): 903–908 (Aug. 1986).

Su et al.; "A Method to Access, Trap, and Monitor Field Populations of the Formosan Subterranean Termite (Isoptera: Rhinotermitidae) in the Urban Environment"; Sociobiology vol. 12 (No. 2), 1986, pp. 299–304.

Su et al.; "Characterization of Slow–acting Insecticides for the Remedial Control of the Formosan Subterranean Termite (Isoptera: Rhinotermitidae)"; Forum: J. Econ. Entomol. 80 (1); pp. 1–4 (Feb. 1987).

Su et al.; "An Overview of the Formosan Subterranean Termite (Isoptera: Rhinotermitidae) in the World"; Proceedings of the International Symposium on the Formosan Subterranean Termite 67th Meeting of the Pacific Branch Entomological Society of America; Oct., 1987; pp. 3–15.

Su et al.; "Effects of Soldier Proportion on the Wood–Consumption Rate of the Formosan Subterranean Termite (Isoptera: Rhinotermitidae)"; Sociobiology vol. 13, No. 2., 1987, pp. 145–151.

Su et al.; "Alate Production of a Field Colony of the Formosan Subterranean Termite (Isoptera: Rhinotermitidae)"; Sociobiology vol. 13, No. 3, 1987; pp. 209–215.

Su et al.; "Initiation of Worker–Soldier Trophallaxis by the Formosan Subterranean Termite (Isoptera: Rhinotermitidae)"; Insectes Sociaux, Paris, 1987, vol. 34, No. 4, pp. 229–235.

Su et al.; "A Behavioral Assay for Measuring Feeding Deterrency of a Slow–acting Biocide, A–9248, Against the Formosan Subterranean Termite (Isoptera: Rhinotermitidae)"; The International Research Group on Wood Preservation; Mar. 7, 1988; pp. 1–7.

Su et al.; "Toxicity and Lethal Time of N–Ethyl Perfluorooctane Sulfonamide Against Two Subterranean Termite Species (Isoptera: Rhinotermitidae)"; The Florida Entomologist, vol. 71 (1); Mar., 1988; pp. 73–78.

Su et al.; "Toxicity and Feeding Deterrency of a Dihaloalkyl Arylsulfone Biocide, A–9248 Against the Formosan Subterranean Termite (Isoptera: Rhinotermidtidae)"; J. Econ. Entomol. 81(3); 850–854 (Jun. 1988).

Su et al.; "The Formosan Subterranean Termite, Foraging Populations, Territories, and Competition with the Eastern Subterranean Termite in an Urban Habitat"; Pest Management, Jul. 1988; pp. 16–25.

Su et al.; "Retention Time and Toxicity of a Dye Marker, Sundan Red 78, on Formosan and Eastern Subterranean Termites (Isoptera: Rhinotermitidae)"; J. Entomol. Sci. vol. 23, No. 3 (Jul. 1988) pp. 235–239.

Su et al.; "Intra– and Interspecific Competition of the Formosan and the Eastern Subterranean Termite: Evidence from Field Observations (Isoptera: Rhinotermitidae)"; Sociobiology vol. 14, No. 1, 1988, pp. 157–164.

Su et al.; "Foraging Population and Territory of the Formosan Subterranean Termite (Isoptera: Rhinotermitidae) in an Urban Environment"; Sociobiology vol. 14, No. 2, 1988, pp. 353–359.

Su et al.; "Concentration–Time Relationship for Fumigant Efficacy of Sulfuryl Fluoride Against the Formosan Subterranean Termite (Isoptera: Rhinotermitidae)"; J. Econ. Entomol. 82(1); 156–158 (Feb. 1989).

Su et al.; "Comparative Effects of an Insect Growth Regulator, S–31183, Against the Formosan Subterranean Termite and Eastern Subterranean Termite (Isoptera: Rhinotermidae)"; J. Econ. Entomol. 82(4); 1125–1129 (Aug. 1989).

Su et al.; "Method to Monitor Initiation of Aerial Infestations by Alates of the Formosan Subterranean Termite (Isoptera: Rhinotermitidae) in High–Rise Buildings"; J. Econ. Entomol. 82(6); 1643–1645 (Dec. 1989).

Su et al.; "High–Rise Termites, Aerial Infestations of Formosan Subterranean Termite Alates"; Pest Management, Feb. 1990, pp. 22–24.

Mix; "A Look Into The Future"; Pest Control, Mar., 1990; pp. 50–54.

Su et al.; "Comparison of Eleven Soil Termiticides Against the Formosan Subterranean Termite and Eastern Subterranean Termite (Isoptera: Rhinotermitidae)"; J. Econ. Entomol. 83 (5); Oct. 1990; pp. 1918–1924.

Su et al.; "Economically Important Termites in the United States and Their Control"; Sociobiology, vol. 17, No. 1, 1990; pp. 77–94.

Su et al.; "Potential of Insect Growth Regulators as Termiticides: A Review"; Sociobiology, vol. 17, No. 2, 1990; pp. 313–328.

Su et al.; "Laboratory Evaluation of Two Slow–Acting Toxicants Against Formosan and Eastern Subterranean Termites (Isoptera: Rhinotermitidae)"; J. Econ Entomol. 84 (1) Feb. 1991; pp. 170–175.

Su et al.; "Remedial Wood Preservative Efficacy of BORA–CARE™ Against the Formosan Subterranean Termite and Eastern Subterranean Termite (Isoptera: Rhinotermitidae)"; The International Research Group on Wood Preservation; Apr. 2, 1991; pp. 1–8.

Su et al.; "Laboratory Evaluation of Disodium Octaborate Tetrahydrate (TIM–Bor) as a Wood Preservative or a Bait––Toxicant Against the Formosan and Eastern Subterranean Termites (Isoptera: Rhinotermitidae)"; The International Research Group on Wood Preservation; Apr. 24, 1991; pp. 1–12.

Su et al.; "Population Suppression of Subterranean Termites by Slow–Acting Toxicants"; Proceedings of the Symposium on Current Research on Wood–Detroying Organisms and Future Prospects for Protecting Wood in Use, U.S. Dept. of Agriculture; May, 1991; pp. 51–57.

Su et al.; "Uniform Size Particle Barrier: A Physical Exclusive Device Against Subterranean Termites (Isoptera: Rhinotermitidae)"; Journal of Economic Entomology, vol. 84, No. 3, Jun., 1991; pp. 912–916.

Su et al.; "Suppression of Foraging Populations of the Formosan Subterranean Termite (Isoptera: Rhinotermitidae) by Field Applications of a Slow–acting Toxicant Bait"; Journal of Economic Entomology, vol. 84, No. 5; Oct., 1991; pp. 1525–1531.

Su; "Evaluation of Bait–Toxicants for Suppression of Subterranean Termite Populations"; Sociobiology, vol. 19, No. 1, 1991 pp. 211–220.

Su et al.; "Evaluation of Twelve Dye Markers for Population Studies of the Eastern and Formosan Subterranean Termite (Isoptera: Rhinotermitidae)"; Sociobiology, vol. 19, No. 2, 1991; pp. 349–362.

Su et al.; "Agonistic Behavior Among Colonies of the Formosan Subterranean Termite, *Coptotermes formosanus* Shiraki (Isoptera: Rhinotermidae), from Florida and Hawaii: Lack of Correlation with Cuticular Hydrocarbon Composition"; Journal of Insect Behavior, vol. 4, No. 1, 1991, pp. 115–128.

Su et al; "Recent Advances in Termite Biology and Control"; Proceedings of the National Conference on Urban Entomology, 1992; pp. 93–101.

Su; "Basic Research Keys Development of New Termite Control Bait"; Pest Control, Jun. 1993, 61:38–48.

Shaheen; "Fascinating Behavior Keeps Su Mystified"; Pest Control, Jun. 1993.

Su; "Baits, Are They in the Future of Termite Control? At Least One Prominant Termite Researcher Thinks So"; Pest Control Technology, Jul., 1993.

Su et al.; "A Shallow Sub–surface Monitoring Station for Subterranean Termites (Isoptera);" Sociobiology, vol. 23, No. 2, 1993; pp. 175–182.

Su; "Field Evaluation of a Hexaflumuron Bait for Population Suppression of Subterranean Termites (Isoptera: Rhinotermitidae)"; Journal of Economic Entomology, vol. 87, No. 2, Apr. 1994; pp. 389–397.

Su et al.; "Estimating Oral Toxicity of Slow–Acting Toxicants Against Subterranean Termites (Isoptera: Rhinotermitidae)"; Journal of Economic Entomology, vol. 87, No. 2 Apr. 1994; pp. 398–401.

Tamashiro et al.; "A Simple Method to Observe, Trap, and Prepare Large Numbers of Subterranean Termites for Laboratory and Field Experiments"; Environmental Entomology, vol. 2., No. 4, pp. 721–722, Aug. 1973.

Verkerk; *Building Out Termites*; "Curative Termite Management in Existing Buildings"; 1990; pp. 133–138.

Gao, D., B. Zhu, B. Gan, S. He, and S. Yuan. 1985. "A new toxic bait for the control of forest–infesting termites". J. Nanjing Inst. Forest. 3: 128–131 (in Chinese with English summary).

Grace, J.K. 1990. "Mark–recapture studies with *Reticulitermes flavipes* (Isoptera: Rhinotermitidae)". Sociobiol. (in press as of Jun. 1990).

Su. N.–Y. 1982. "An Ethological approach to the remedial control of the Formosan subterranean termite, *Coptotermes formosanus* Shiraki". Ph.D. diss. Univ. of Hawaii. Honolulu, Hawaii.. 124pp.

Su., N.–Y., and R.H. Scheffrahn. 1986. "The Formosan subterranean termite, *Coptotermes formosanus* (Isoptera: Rhinotermitidae) in the United States": 1907–1985, pp. 31–38. In: P. A. Zungoli [ed.], Proc. Nat'l. Conference Urban Entomol. Univ. Maryland, College Park, MD.

Su, N.–Y. and R. Scheffrahan. 1987. "Current status of the Formosan Subterranean Termite in Florida", pp. 32–37. In: M. Tamashiro and N.–Y. Su [eds.], Biology and control of the Formosan subterranean termite. Collect of Trop. Agr. Human Resources, Univ. of Hawaii, Honolulu, HI.

La Fage, et al., Environmental Entomology, (1973) 2(5): 954–56, "Desert Subterranean Termites: A Method for Studying Foraging Behavior.".

Esenther, et al., Sociobiology, (1979) 4(2): 215–22, "Termite Control: Decayed Wood Bait.".

Beal et al., Sociobiology, (1980), "A new approach to subterranean termite control—the bait block method." 5(2): 171–4.

Gonzales, J. Philipp. Ent. 4(6): 543–47, 1981, "Urban Pest control in the Philippines".

French et al., Sociobiology (1981) 6(2):135–51 "A rapid and Selective Field Assessment of Termite Wood Feeding Preference on the Subterranean Termite H. Ferro using Toilet roll and small wood block baits".

Ferrar, P. Oecologie 52:139–46 (1982) "Termites of South African Savanna III Comparative Attach on Toilet Roll Baits in Subhabitats".

Ali, AM et al., *Assiut Journal of Agricultural Sciences*, (1982) "Surface Activity of Termite in the New Valley", V. 13, No. 3, p. 73.

Degroot, USDA workshop on termiticides in building protection Sep. 2223, 1982. "Alternatives to termiticides in building protection.".

Badawi, et al., Zeitschrift fur angewandte Entomologie, (1984) Population studies of some species of termites in Al–Kharj Oasis, Central Region of Saudi Arabia:, pp. 253–261.

Thompson, C. Florida Entomologist 68 (4): 641–5 Dec. 1985, "Bait Stake detection of the Formosan termite in south Florida".

French et al., Sociobiology 11(3): 303–309 (1986) "Mound Colonies of C. lacteus Eat Cork in preference to sound wood".

Abushama, et al., *Journal of Arid Environments*, (1988), "The foraging activity of subterranean termites in the Kuwait Desert", v. 14, pp. 75–82.

Epsky, et al., Ent. Soc. of Amer. (1988), "Efficacy of the Entomogenous Nematode etc.", 81 (5): 1313–17.

Duncan., Protection News bulletin of the Plant Protection Research Inst., Pretone, ZA, Mar. 1988, "Research into baits for harvester termite control".

Grace, Pan–Pacific Entomologist 65(4), 1989 381–384, "A Modified Trap Technique for Monitoring R. Subterranean Termite Populations".

Grace, Paper for the 21st annual meeting May 14–18, 1990 in NZ, International Research Group on Wood Preservation, "Termites in Eastern Canada: An Updated Review and Bibliography".

Grace, paper for 21st annual meeting May 14–18, 1990 in NZ; "Preliminary Evaluation of Borate Baits and Dusts for Eastern Subterranean Termite Control".

Logan et al., Bull. of Ent. Research 1990 80:19–26 "Lab Trials on the toxicity of hydramethylnon to R. santonensis etc." authors from Overseas Development Natural Resources Inst., in UK and Faculty University Pertanian in Malaysia.

Miller, CSIRO, in Australia, publication (no date but 1990 or later based on reference cited): "Fluorescent Dyes as Markers in Studies of Foraging Biology of Termite Colonies".

Ewart et al., Sociobiology 20(1):17–22 (1992) "Hollow Stakes for Detecting Subterranean Termites (Isoptera: Rhinotermitidea)".

Begon M. [1979] *Investigating animal abundance: capture–recapture for biologies*, University Park Press, Baltimore, MD.

La Fage, J.P., N.-Y. Su, M. J. Jones and G. R. Esenther. 1983. A rapid method for collecting large numbers of subterranean termites from wood. Sociobiology 7: 305–309.

Scheffrahn, R. H., and N.-Y. Su. 1987. Structure/activity relationships of 2–haloalkanoic acids and their esters as antitermitic agents against the Formosan subterranean termite (Isoptera: Rhinotermitidae). J. Econ. Entomol. 80: 312–316.

Haverty, M. I., N.-Y. Su, M. Tamashiro, and R. Yamamoto. 1989. Concentration–dependent presoldier induction and feeding deterrency: potential of two insect growth regulators for remedial control of the Formosan subterranean termite (Isoptera: Rhinotermitidae). J. Econo. Entomol. 82: 1730–1374.

Grace, Forest Products Journal 42 (2): 66–65 1992, "Resistance of borate–treated Douglas fir to the Formosan subterranean termite".

Esenther, "Estimating the Size of Subterranean Termite Colonies By a Release–Recapture Technique," The International Research Group on Wood Preservation; Feb. 29, 1980; pp. 1–5.

Lai, P.Y. 1977. Biology and Ecology of the Formosan Subterranean Termite, *Coptotermes formosanus*, and its Suspectibility to the Entomogenous Fungi, *Beaveria bassiana* and *Metarrhizium anisopliae*. Ph.D. Dissertation, University of Hawaii.

Su, N.-Y., P.M. Ban, and R.H. Scheffrahn. 1993. Foraging populations and territories of the eastern subterranean termite (Isoptera: Rhinotermitidae) in southeastern Florida. Environ. Entomol. 2: 1113–1117.

Su N.-Y., E.M. Thoms, P.M. Ban, and R.H. Scheffrahn. 1995. A monitoring/baiting station to detect and eliminate foraging populations of subterranean termites (Isoptera: Rhinotermitidae) near structure. J. Econ. Entomol. 88 (4): 932–936 (Aug. 1995).

Su, N.-Y. 1991. Termites of the United States and their control. SP World, 17: 12–15.

Su N.-Y. 1993. –Methodologies for termiticide testing and standardization. The Int'l. Res. Group on Wood Preservation. Document No. IRG/WP/993–10043. pp. 1–5.

Su, N.-Y. 1994. The termite bait age dawns. Pest Control. 62: 36–38.

Su, N.-Y., and R.H. Scheffrahn. 1990. Update of the Formosan subterranean termite. pp. 41–45. Proc. Nat'l. Conference on Urban Entomology. Clemson, S.C.

Su, N.-Y. 1993. Managing subterranean termite populations. In: Wildey, K.B. and W.H. Robinson, [eds.], pp. 45–50. Proc. of the 1st Int'l. Conf. on Insect Pests in the Urban Environment.

METHODS AND APPARATUSES FOR MONITORING OR CONTROLLING PESTS

CROSS-REFERENCE TO RELATED APPLICATION

This application claims the benefit of U.S. Provisional Application No. 60/043,952, filed Apr. 15, 1997.

BACKGROUND OF THE INVENTION

1. Field of the Invention

The present invention relates generally to methods and apparatuses for monitoring and/or controlling pests, as might be particularly useful for monitoring and/or controlling a population of termites.

2. Description of the Prior Art

Many types of termites are soil dwellers (i.e., subterranean termites) and exist in large colonies that can contain several million termites. Members of the colony forage for food and burrow galleries or passageways in the soil outwardly from the colony or nest, and portions of food located by foraging termites are returned to the nest. Termites can be very destructive because of their voracious appetite, especially for wood or other cellulosic materials. The ability of termites to cause considerable damage is in part due to the fact that the termites and external signs of damage caused by the termites are typically not seen until termite infestation is at a relatively advanced stage. Termites are difficult to detect and control because they are cryptic creatures that usually cause damage to the interiors of wooden structures, or otherwise in places that are not readily observable. Accordingly, the control of termites requires enormous expenditures.

Traditional methods for controlling pests such as termites include preventive measures such as pre-treatment of new construction sites with pesticidal agents to prevent subsequent infestation by pests. Under this pre-treatment approach, pesticides are typically sprayed over and into the soil prior to construction of a structure in an attempt to establish a termite barrier around the perimeter of the new structure. For example, the soil present at a new construction site can be pre-treated by trenching, that is, digging a trench in the soil so that the trench surrounds the area to be occupied by the structure and depositing a relatively large amount of pesticide in the trench. Unfortunately, such barriers are often broken or otherwise disturbed during the construction process. This approach also requires that the soil be periodically re-treated in order to maintain the effectiveness of the barrier in precluding termite invasion. After a termite colony discovers one or more discontinuities in a termite barrier, the pretreated building is susceptible to termite attack.

Other traditional methods for controlling termites involve post-infestation efforts. For example, one method utilizes pressure injection of pesticides to directly treat termite galleries. Another approach involves fumigation of a structure infested by termites by tightly tenting (i.e., closing or sealing) the structure and filling the tent with gaseous pesticide. These traditional methods fail, however, to provide any means for satisfactorily detecting termite infestation. These traditional treatments are also inadequate because they only affect those termites which come into direct contact with the pesticides, which is often only a small portion of the subterranean termite population. In addition, precautions must be taken to avoid exposing non-target species and the environment to the pesticides.

A more recent development in termite control technology pertains to the use of a termite bait matrix containing a relatively small amount of a pesticide, such as a termiticide. In general, such methods and apparatuses are directed to controlling pests once they have been detected as a result of a monitoring procedure. After detection, the pests are controlled by inducing the pests to ingest or otherwise come into contact with a toxicant in a bait matrix which is attractive to pests, particularly pests from a specific nest or colony.

More specifically, termites communicate the location of a food source to other termites within their colony by chemical signals such as pheromones. These characteristics may be exploited to effectively control pest infestations. In the course of traveling to the nest, an insect may leave highly specific trail pheromones which direct or recruit other insects to a food source. Subsequently, other insects, usually from the same colony, detect the chemical signal and are thus directed to that food source. The concentration and composition of these pheromones can be species and colony specific, and trail pheromones may be very different from feeding-initiating pheromones. Deposit of specific pheromones in a toxicant-containing matrix food source, i.e., a bait matrix, by foraging insects aids in recruiting other nestmates to the toxicant-containing matrix, whereupon they forage, are exposed to toxicant, and deposit more pheromone, thus creating a cyclical control method. Toxicants to be delivered to insect populations are preferably slow-acting, lethal at concentrations which do not repel target insects, and capable of being combined with an insect food. Insects directly contacting or ingesting the toxicant will not be killed immediately, but will travel to their colony to recruit other nestmates to the toxicant, thereby resulting in the control of large numbers of colony members due to interactions with the colony before death occurs.

In providing methods and apparatuses for monitoring and/or controlling pests (i.e., delivery of toxicant to pests), it is advantageous to minimize disruption to a site where pests have begun feeding. Where such a site is located in the soil, site disruption is minimized, for instance, as described in PCT international publication 93/05004 and U. S. Pat. No. 5,329,726, by using a station housing which is permanently fixed into the soil and capable of being periodically refilled with replacement monitoring and/or toxicant-containing bait matrices.

Termite baiting systems provide significant advantages over the traditional methods of controlling termites. Significantly, efficacious termite baiting systems typically require dramatically lower amounts of pesticide to control or eliminate termite infestations and may reduce the risk of pesticide exposure to non-target species and the environment. Typically, termite baiting systems or stations that have heretofore been disclosed require removal of the contents of the delivery station housing (i.e., the pest food source used for pest monitoring or the pest baiting matrix containing pesticide) to determine whether termites are present or not. The disruption caused by removal of the inner contents is believed to lead in some cases to the pests' premature abandonment of termite bait stations. In this regard, the efficacy of termite bait systems that have heretofore been provided is severely hampered because the termites that feed on the inner contents are sufficiently disturbed by the removal of the inner contents that the termites abandon the bait station before they have ingested sufficient pesticide to control the target termite colony.

Despite the availability of such termite baiting systems, it will be appreciated from the foregoing that there exists a need in the art for termite baiting stations in which station abandonment by termites is reduced. There also exists a need for improved devices and methods for delivering termiticides that can be used for controlling or eliminating termites above, on or below ground.

SUMMARY OF THE INVENTION

The aforesaid problems are solved, in accordance with the present invention, by a pest monitoring or baiting device that is useful for monitoring and/or controlling pests, such as termites, either alone or as part of a pest monitoring or baiting station. More specifically, the pest monitoring or baiting device of the invention comprises an outer wall, an inner wall defining a substantially enclosed channel which is adapted to receive an extractor means for selectively moving the device, and a pestedible material disposed between the inner and outer walls.

The invention also relates to a pest monitoring or baiting station comprising a housing having openings sized to permit pests to pass through the openings so that pests can gain access to the interior of the housing from a location outside the housing. The station also comprises first and second devices adapted to be removably disposed within the housing in stacked relationship, wherein each of the first and second devices is either a pest monitoring device or a pest baiting device which is used respectively for monitoring or treating for pests.

Further, the invention relates to a pest monitoring or baiting station comprising a housing and a first device as described above and a first extractor means adapted to be received in the channel of the first device for use in selectively moving the first device.

In a method of the invention, a device as described above is provided and is periodically monitored to determine whether any portion of the pest-edible material has been consumed by pests. In a second method, a pest baiting device having a toxicant incorporated into its pest-edible material is provided, and pests are exposed to the device.

In a third method, a pest monitoring device as described above is provided in an area where pest presence is to be determined, and a first extractor means is slidably received within the channel of the device for selectively moving the device. The device is periodically monitored by checking for pest activity. A pest baiting device is provided in an area which is determined to contain pests, the pest baiting device comprising a pest-edible bait matrix, a slow-acting toxicant, an inside wall defining a substantially enclosed channel, and a second extractor means slidably received within the channel of the pest baiting device for selectively moving the pest baiting device.

Advantageously, the devices, apparatuses and methods according to the present invention utilize a relatively small quantity of pesticidal agent, if any, with minimal risk of contamination to the environment or to non-target species. In addition, the pest monitoring or baiting devices of the present invention are versatile inasmuch as they are compatible with in-ground, on-ground and above-ground stations, and can even be used by themselves without necessarily being enclosed within an associated housing. These devices also reduce the risk of worker exposure to hazardous chemicals and are easy to monitor, move, transport or replace. Pest monitoring or baiting stations according to the present invention are desirable because they can in some instances reduce or eliminate the incidence of station abandonment by pests.

The present invention will be more fully understood upon reading the following detailed description of the preferred embodiments in conjunction with the accompanying drawings.

DETAILED DESCRIPTION OF THE PREFERRED EMBODIMENTS

The following portion of this specification, taken in conjunction with the drawings, sets forth the preferred embodiments of the present invention. Embodiments of the invention disclosed herein include the best mode contemplated by the inventors for carrying out the invention, although it should be understood that various modifications of the invention could be made while remaining within the parameters of the present invention.

Figure 1:
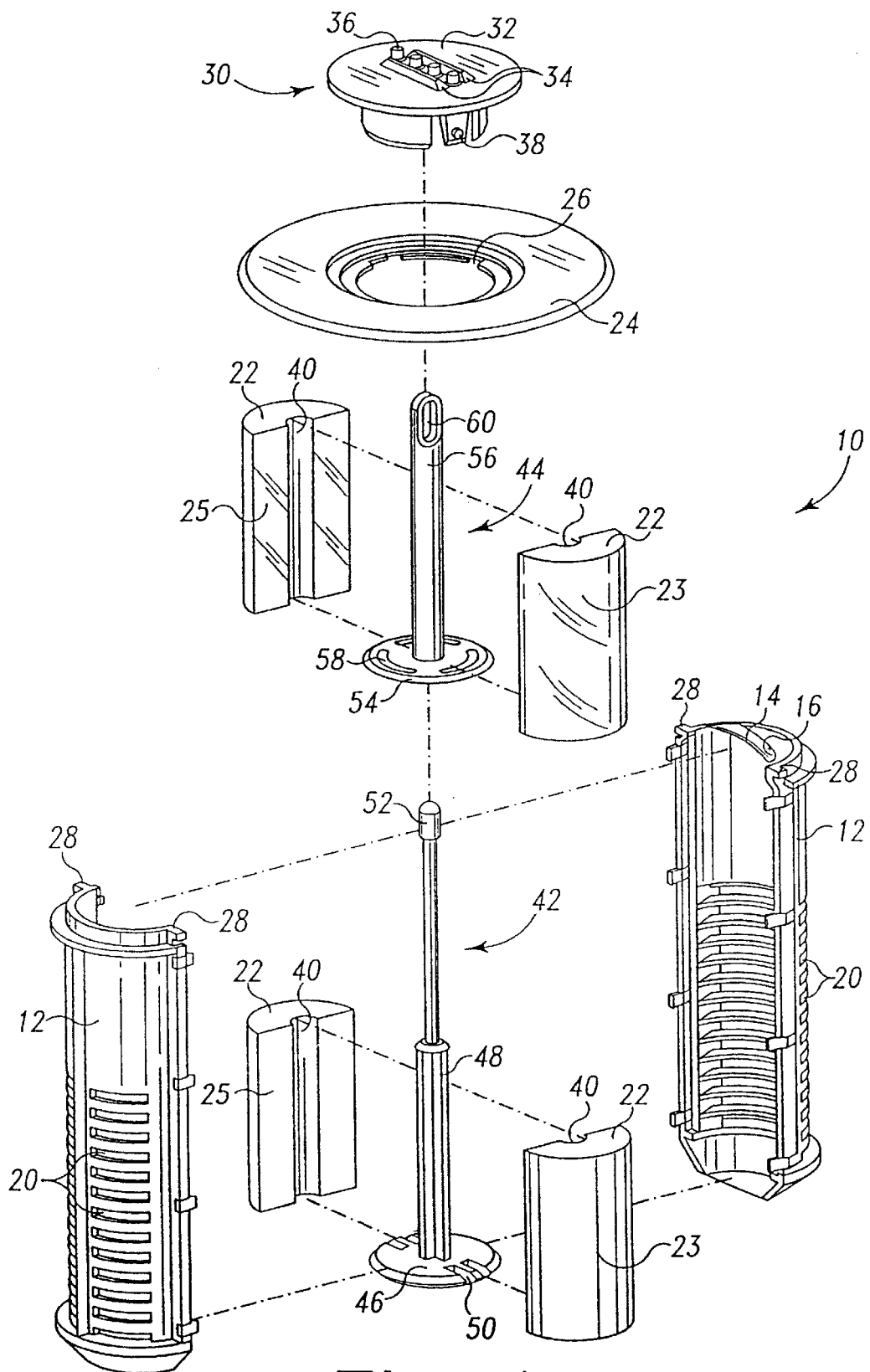
FIG. 1 is an exploded view of a pest monitoring or baiting station including exemplary pest monitoring devices received by two different extractor means as utilized with a pest monitoring or baiting station housing.

Referring to the drawings for a detailed description of the present invention, reference is first made to FIG. 1 which depicts one embodiment of an exemplary pest monitoring or baiting station 10 in accordance with the present invention. Station 10 has particular utility for use in monitoring and/or controlling termites but can be utilized for other insects or pests by incorporating monitoring or baiting devices comprising a food source suitable for the insect or pest in question. Station 10 comprises two identical housing halves 12 which when affixed together constitute housing 12 which is typically used for in-ground applications but may be used for on-ground or above-ground applications. The housing halves are typically made so that they can simply be snapped together. Housing 12 is provided with at least one, and preferably a plurality, of apertures 20 in its sidewalls, typically in the form of elongated slots for permitting pests such as termites to gain access to the interior of housing 12 from a location outside the housing so that the pests can be exposed to pest monitoring devices 22. As shown, it is frequently helpful to have no apertures 20 in the upper part of housing 12 to prevent occasional undesired invaders, such as slugs or ants which tend to stay near the surface of the ground, from gaining access to the interior of the housing. Housing 12 also typically comprises at least one, preferably two oppositely disposed, inclined ramps 14 which each terminate at a ramp end aperture 16 which extends through the sidewall of housing 12.

A top end flange 24 is typically attached to the top of housing 12 and preferably extends radially outwardly from housing 12. Top end flange 24 preferably comprises at least one keyway 26, preferably two oppositely disposed keyways 26, in top end flange 24, and at least one corresponding key 28 can be provided on housing 12. Key 28 of housing 12 can be received in keyway 26 of top end flange 24 and then top end flange 24 can be rotated relative to housing 12 to lock top end flange 24 onto housing 12. As shown in FIG. 1, when the halves of housing 12 are snapped together, there preferably are formed two oppositely disposed keys 28 which are adapted to be received in the corresponding oppositely disposed keyways 26 of top end flange 24. Top end flange 24 is provided to shield housing 12 from the heat of the sun when housing 12 is disposed in the ground.

Top end flange 24 receives a top cap 30 which is preferably a quarter-turn locking cap and which provides an ability for authorized pest control operators to access housing 12, while restricting access by others, to the contents of housing 12. Top cap 30 preferably comprises a planar upper surface 32 having disposed thereon two generally parallel raised protuberances 34 which are adapted to receive between them an appropriately sized key (not shown) for turning top cap 30 either clockwise for locking top cap 30 onto housing 12 or counter-clockwise for unlocking top cap 30 from housing 12. Top cap 30 further preferably comprises a plurality of, preferably four, cylindrically-shaped nubs or posts 36 extending generally perpendicularly from upper surface 32. Posts 36 can be sized to be slightly smaller than corresponding surfaces of the key (not shown) to provide a friction fit between the key and posts 36 of top cap 30 and thereby make the key tend to stay engaged with top cap 30 when using the key to lock/unlock top cap 30 onto/from housing 12. Also, top cap 30 preferably comprises at least one, preferably two opposing, radially outwardly extending posts 38 which are each adapted to slide down an inclined ramp 14 of housing 12 and then be generally axially aligned with its respective ramp end aperture 16 when top cap 30 is locked or secured onto housing 12.

Pest monitoring devices 22 comprise any material that termites will feed on and/or will attract termites to housing 12. FIG. 1 illustrates pest monitoring devices 22 in the form of four generally semi-cylindrical wood blocks. A lower set of two semi-cylindrical blocks 22 when disposed in housing 12 form an outer wall 23 and an inner wall 25 which defines a substantially enclosed channel 40 which is adapted to receive (preferably slidably receive) an extractor means 42 which can be used to selectively move the lower set of pest monitoring devices 22. Similarly, an upper set of two semi-cylindrical blocks 22 when disposed in housing 12 also form an outer wall 23 and an inner wall 25 which defines a substantially enclosed channel 40 which is adapted to receive (preferably slidably receive) an extractor means 44 which can be used to selectively move the upper set of pest monitoring devices 22. Each pest monitoring block 22 comprises a pest-edible material disposed between its inner and outer walls.

Each semi-cylindrical wood block preferably comprises a type of wood that is most desirable to the particular type of pest that is to be monitored or controlled. Various types of wood which may be suitable are disclosed in the prior art. For example, in a 1972 publication, Behr et al. disclose and compare basswood, aspen, cottonwood, paper birch, soft maple, yellow poplar (tulip poplar), beech, pecan, hard maple and persimmon (Behr, E. A., C. T. Behr, & L. F. Wilson. 1972. Influence of Wood Hardness on Feeding by the Eastern Subterranean Termite, *Reticulitermes flavipes* (Isoptera: Rhinotermitadae). Ann. Entomol. Soc. Am. 65(2): 457–460). Other types of wood that may be suitable are southern yellow pine, balsam fir and Engelmann spruce. It will be apparent to those skilled in the art that any number of cylindrical blocks could be utilized as desired provided that the blocks form a substantially enclosed channel. Substantially enclosed channel 40 extends at least partially, and preferably completely, through monitoring device or devices 22.

Extractor means 42 typically comprises a base 46 for supporting the lower monitoring device 22, and base 46 is attached to an elongated finger or member 48 which preferably extends substantially perpendicularly from base 46. Elongated member 48 is the part of extractor means 42 adapted to be received (preferably slidably received) in substantially enclosed channel 40 formed by the lower monitoring device or devices 22. Base 46 typically comprises a plurality of apertures or openings 50 preferably in the form of elongated slots which are large enough to permit the pests to be monitored or controlled to pass therethrough. Extractor means 42 is also typically provided with a gripping means 52 to facilitate handling, movement and/or transport of the lower pest monitoring device 22. By way of example, gripping means 52 can be integrally formed on elongated member 48, as shown in FIG. 1 on the end of elongated member 48 opposite base 46. Extractor means 42 can engage the lower monitoring device 22 by being received in the substantially enclosed channel 40 of the pest monitoring device 22. The extractor means 42 can be utilized to facilitate the movement or transport of the lower monitoring device 22 within or into and out of housing 12. Gripping means 52 can be used to facilitate the movement of extractor means 42, and hence the lower monitoring device 22, by engaging gripping means 52 with one's fingers or the like. Other alternative configurations for extractor means 42 are possible, so long as elongated member 48 is capable of engaging the lower pest monitoring device 22.

Extractor means 44 is somewhat similar to extractor means 42 and comprises a base 54 for supporting the upper monitoring device or devices 22, and base 54 is attached to an elongated finger or member 56 which preferably extends substantially perpendicularly from base 54. Elongated member 56 is the part of extractor means 44 adapted to be received (preferably slidably received) in substantially enclosed channel 40 formed by the upper monitoring device or devices 22. Base 54 typically comprises a plurality of apertures or openings 58 preferably in the form of elongated slots which are large enough to permit the pests to be monitored or controlled to pass therethrough. Extractor means 44 is also typically provided with a gripping means 60 to facilitate handling, movement and/or transport of the upper pest monitoring device or devices 22. Gripping means 60 can be integrally formed on elongated member 56 at the end of elongated member 56 opposite base 54. Extractor means 44 can engage the upper monitoring device or devices 22 by being received in the substantially enclosed channel 40 of the upper pest monitoring device or devices 22. Extractor means 44 can be utilized to facilitate the movement or transport of the upper monitoring device 22 within or into and out of housing 12. Other alternative configurations for extractor means 44 are possible, so long as elongated member 56 is capable of engaging and moving the upper pest monitoring device 22. Gripping means 60 can take the form of an orifice provided in the end of elongated member 56 which is opposite from base 54. The orifice can advantageously facilitate engagement of gripping means 60 with a gripping means actuator, such as a hook, finger, or the like.

Figure 2:
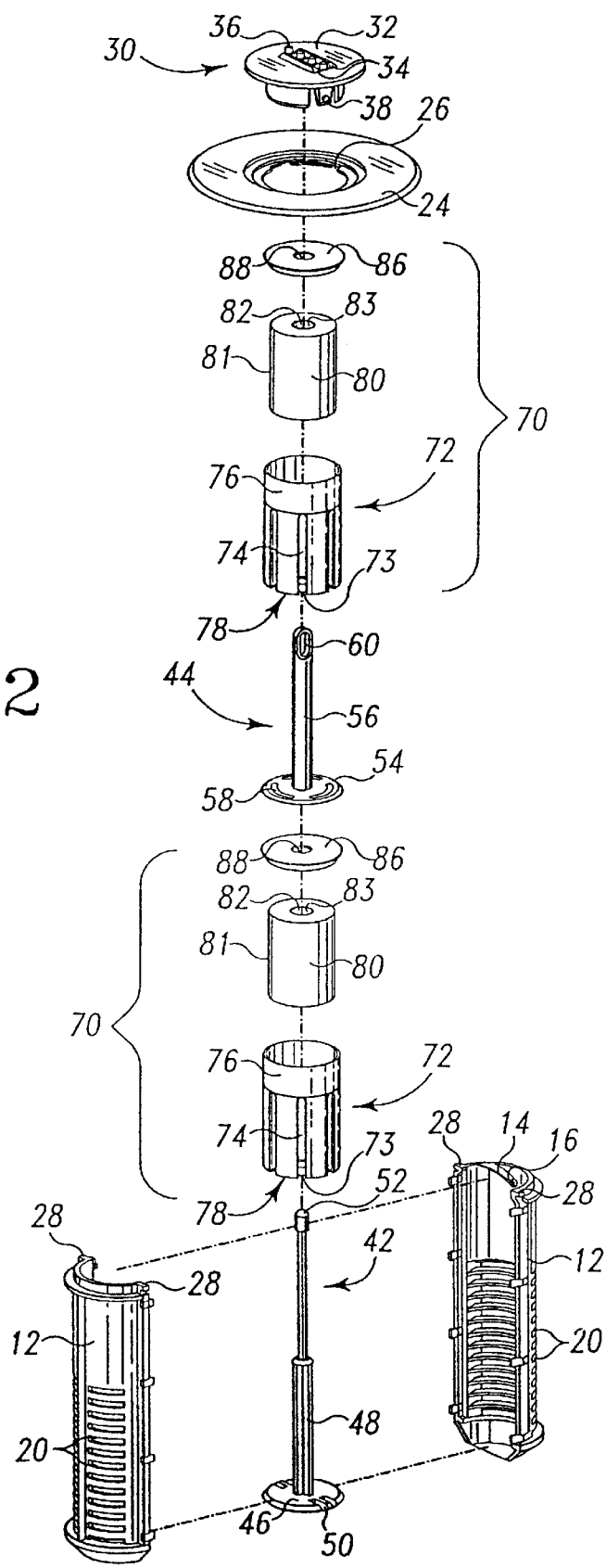
FIG. 2 is the same as FIG. 1 but illustrates two exemplary pest baiting devices in exploded view rather than the pest monitoring devices depicted in FIG. 1.

Typically after pest activity has been observed in housing 12, a pest control operator can remove the upper pest monitoring device 22 and optionally also the lower pest monitoring device 22 and replace the monitoring device or devices 22 with pest baiting device or devices 80. Although it is not necessary for the practice of the present invention, in order to minimize contact of the pest control operator with toxicant, it is preferable to use a pest baiting apparatus 70, examples of which are shown in FIG. 2. Typically, extractor means 42 and 44 will also be utilized with pest baiting apparatuses 70 as shown. FIG. 2 illustrates an application in which two pest baiting apparatuses 70 are being utilized, but it should be apparent to those skilled in the art that it would be possible, and in some cases preferred, to leave the lower pest monitoring device in housing 12 undisturbed and replace only the upper pest monitoring device with pest baiting device 80 or pest baiting apparatus 70.

Pest baiting apparatus 70 typically comprises a cup or container 72, which is preferably formed from a thermoplastic material and is translucent or transparent, having apertures such as elongated slots 74 thereon which can extend along sidewalls 76 of the cup and/or along its bottom 78. Slots 74 are large enough to permit pests to migrate therethrough so that the pests can gain access to the interior of cup 72 from a location outside cup 72. Cup 72 comprises a bottom opening 73 which is adapted to receive extractor means 42 or 44. Cup 72 is used to retain a pest baiting device 80 which comprises an outer wall 81, an inner wall 83 defining a substantially enclosed channel 82 which is adapted to receive (preferably slidably receive) extractor means 42 or 44, and a pest-edible material disposed between outer wall 81 and inner wall 83. Channel 82 is typically formed as a substantially central opening or core of pest baiting device 80 and extends at least partially through, and preferably completely through, pest baiting device 80. Channel 82 is sufficiently large to receive an extractor means which can be utilized to move or transport the pest baiting device 80 as described in more detail below. Although FIG. 2 depicts pest baiting device 80 and pest baiting apparatus 70 as having generally cylindrical configurations and thus, generally annular cross-sections, these are merely exemplary configurations, and a variety of other configurations could be used in connection with the present invention without departing from the scope of the invention. Further, cup 72 could be used to retain a monitoring device such as the monitoring device or devices 22 shown in FIG. 1.

Pest baiting apparatus 70 also typically comprises a cap 86 having an opening 88 which is adapted to receive extractor means 42 or 44. Cap 86 and cup 72 can be designed so that cap 86 screws onto cup 72 if desired, or is snap fit onto cup 72, or otherwise suitably secured to cup 72 in removable fashion if desired. However, cap 86 is not a necessary component of pest baiting apparatus 70. When pest baiting apparatus 70 is engaged by extractor means 42 or 44, the extractor means typically extends through bottom opening 73 of cup 72, through channel 82 of device 80, and through opening 88 of cap 86 such that the gripping means of the extractor means is disposed above cap 86. Thus, the gripping means can be actuated to move or transport pest baiting apparatus 70 when extractor means 42 or 44 is engaged with pest baiting apparatus 70.

Device 80 can comprise any pest-edible material. Device 80 can be provided in a variety of forms; however, layered materials or material in the form of sheets is frequently preferred. Device 80 comprises a material that does not repel pests, such as termites, and which is typically readily ingested by the pest. In particular, a suitable matrix material is any matrix suitable for the pest species being monitored or controlled and, when the pests are termites, is preferably formable from fibrous or modified fibrous substances, e.g., cellulose-containing materials. Suitable cellulose-containing materials include, but are not limited to, paper, paper products (either 100% virgin paper, recycled paper, or a combination of virgin paper and recycled paper), cotton linter, cardboard, paperboard, wood particles or wood flour, recycled paper or cellulose ethers such as methylcellulose, hydroxypropylmethylcellulose, and hydroxybutylmethylcellulose, commercially available under the tradename of Methocel® (trademark of The Dow Chemical Company), or other agricultural fibers. These materials can be bleached, typically with one or more solutions, e.g., aqueous solutions, of bleaching chemicals. Paper products and cotton linter can optionally be textured or roughened and can also optionally comprise a plurality of laminated plies. If desired, device 80 can be provided with or associated with a supporting material or structure similar to the supplemental supporting and partitioning structures disclosed in U.S. Pat. No. 5,555,672.

For use with termites and other pest species which are attracted to, or reliant on, the presence of sufficient moisture, water can be added to device 80 and device 80 can further comprise a humectant or other moisture adjusting means for maintaining the moisture content within cup 72 typically at a preselected level. Pheromone mimics and other components making device 80 attractive or non-repellent to the pest species being monitored or controlled can also be provided.

Device 80 typically also includes a toxicant, preferably one which is slow acting, which can be impregnated or incorporated into the matrix. Alternatively, should monitoring of suspected insect activity without insect control be desired, the matrix may be utilized without toxicant. The toxicant is typically a slow-acting pesticide, and when the pests to be controlled are termites, the toxicant is typically a slow-acting termiticide. As described in U.S. Pat. No. 5,556,883, which is incorporated herein by reference, one of ordinary skill in the art will appreciate a suitable manner for preparing and incorporating the toxicant into matrices in accordance with the present invention. Additives such as surface-active agents, stabilizers, penetrants, defoamers, stickers, suspending agents, and dispersing agents may in some instances be used if desired. One of ordinary skill in the art will also readily appreciate a manner for providing the toxicant, for example by printing, spraying, coating, soaking, or otherwise impregnating or providing matrix 80 with the toxicant.

Suitable toxicants are for example, chemical insecticides, insect growth regulators, microbial pathogens or toxins derived therefrom such as those described in PCT international publication 93/23998 and U.S. Pat. No. 5,556,883. Preferred chemical insecticides are those described in U.S. Pat. No. 5,556,883, particularly preferred are those insecticidal compounds referred to in the claims of this patent, and more preferably hexaflumuron. Compounds which are structurally similar to hexaflumuron or the other compounds disclosed in U.S. Pat. No. 5,556,883, or other acyl urea compounds as disclosed in U.S. Pat. No. 4,833,158, e.g., flufenoxuron, may also be utilized. Other suitable toxicants may include certain benzoylphenylurea compounds like those disclosed in U.S. application Ser. No. 08/745,387, filed Nov. 8, 1996, and U.S. Provisional Application Serial Nos. 60/029,742, 60/029,747, and 60/029,748, all filed Nov. 8, 1996, and the toxicants disclosed in PCT international publication 96/32009. U.S. Pat. No. 5,556,883, U.S. application Ser. No. 08/745,387 and U.S. Provisional Application Serial Nos. 60/029,742, 60/029,747, and 60/029,748 are all incorporated by reference herein for their teachings of various pesticide compounds which could be used as the toxicant in connection with the present invention.

Extractor means 42 and/or 44 can be disposed inside housing 12 while engaging pest monitoring devices 22 and/or pest baiting apparatuses 70 to provide a means for conveniently replacing, monitoring or otherwise moving these devices during use. Significantly, extractor means 42 and 44 advantageously allow for monitoring, replacing or otherwise moving these devices while reducing a pest control operator's exposure to the devices, while also not significantly disrupting pest activity so that pests such as termites do not abandon housing 12. It is noted that the use of extractor means 42 and 44 is not limited to pest baiting apparatuses 70 or pest monitoring devices 22 that are in a cylindrical configuration. Extractor means 42 and 44 can be utilized with devices of many different configurations in accordance with the present invention provided those configurations have a substantially enclosed channel extending at least partially, and preferably fully, therethrough or the like for receiving extractor means 42 and/or 44. Further, extractor means 42 and 44 of various other configurations could be used in accordance with the present invention.

Preferably, extractor means 42 and 44 are adapted to be substantially coaxially disposed in housing 12 and coaxially coupled to permit vertical stacking of the corresponding monitoring devices 22 and/or pest baiting apparatuses 70 held thereon, for example, by telescoping at least a portion of elongated member 48 of extractor means 42 within extractor means 44 in the vertical arrangement. Elongated member 48 of extractor means 42 preferably extends a sufficient distance away from base 46 to not only retain a lower monitoring device or pest baiting device but also preferably extends upwardly by a sufficient length to be received in extractor means 44, which typically only needs to be at least as long as the upper monitoring or baiting device. The use of both extractor means 42 and 44 is advantageous inasmuch as it can facilitate uninterrupted feeding of termites if only extractor means 44 and the upper monitoring or baiting device is moved when observing activity at the pest baiting station or when providing additional pest-edible material with or without toxicant.

In other words, the employment of upper and lower monitoring and/or baiting devices allows for monitoring or replacing one device at a time while still permitting some measure of continuity in pest, such as termite, feeding. The pest monitoring and/or baiting devices are generally axially aligned along extractor means 42 and 44. However, pest monitoring and baiting devices are also capable of being generally axially aligned in other orientations, such as horizontally. Although extractor means 42 can be adapted to receive two or more monitoring or baiting devices, extractor means 42 can also be adapted to receive only one such device. Although two extractor means 42 and 44 are shown in the drawings, it will be understood by one of ordinary skill in the art that one or multiple extractor means can be used and may or may not correspond in number to the number of pest monitoring or baiting devices utilized at any one time in a monitoring or baiting station.

Significantly, the monitoring and baiting devices according to the present invention comprise a substantially enclosed channel for receiving the extractor means 42 or 44. In connection with the present invention, these devices can be in any of a number of arrangements having a substantially enclosed channel.

Figure 3:
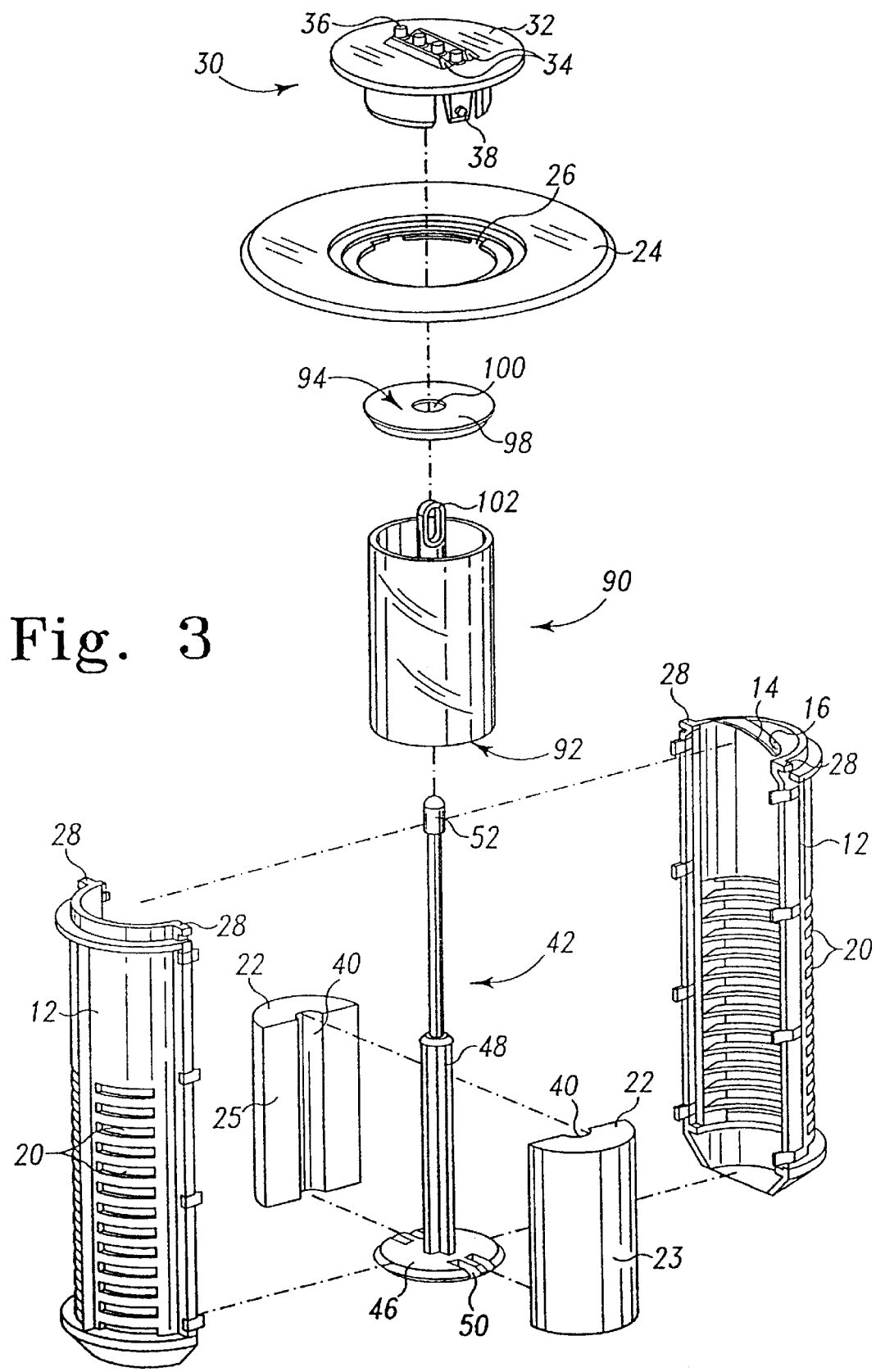
FIG. 3 is the same as FIG. 1 but illustrates in exploded view an exemplary space filling device adapted to be used in place of the uppermost monitoring device and uppermost extractor means depicted in FIG. 1.

Referring now to FIG. 3, pest monitoring or baiting stations according to the invention can comprise a space filling, preferably transparent cup or plug 90, which is substantially resistant to termite consumption and particularly useful for monitoring or controlling "shy" termites or other pests. More specifically, cup 90 is provided to preclude termite feeding thereon so as to avoid any interruption of termite feeding during the monitoring phase as described in more detail below. The lack of interruption is advantageous because termites, especially the so-called "shy" termites, can abandon the station if disturbed during the feeding process.

The transparency of cup 90 facilitates the ability to examine monitoring or baiting devices disposed next to it, typically below it as shown in FIG. 3. Although cup 90 is typically transparent, cup 90 can be provided with non-transparent sidewalls, a substantially transparent bottom end cap 92, and a substantially transparent top end cap 98 or no top end cap at all. Cup 90 typically comprises a substantially enclosed channel (not shown) which extends generally axially therethrough, cap 98 having aperture 100 extending through its bottom surface (not shown) and its top surface 94, and a gripping means 102 for facilitating the handling and movement of cup 90. Cap 98 can be screwed onto cup 90, be otherwise removably secured thereto, be permanently secured thereto, or be integral with cup 90. The channel is formed so that it can receive extractor means 42 or can be utilized in some embodiments without an extractor means. Gripping means 102 can be used to move or transport cup 90.

If desired, during the pest monitoring mode, a pest baiting device like pest baiting apparatus 70 can be used to hold a pest-edible device without a pesticide, although additives such as humectants, pheromone mimics, and other components making the matrix attractive or nonrepellant to the pest species being monitored, can still be included. Humectants, for example, can be included in order to regulate moisture content. One of ordinary skill in the art will appreciate the types of additives that are appropriate for use with the present invention. It is noted that additives such as humectants can be present in both monitoring and control (baiting) modes if desired. Subsequently, the pest baiting device containing matrix without pesticide or other monitoring device being used can be periodically monitored to check for pest activity by ascertaining whether pests such as termites are physically present or whether any portion of the food source present in such devices has been chewed or eaten. Checking for pest activity is facilitated by one or more extractor means, as described above.

The present invention allows for presentation of substantially coaxial, vertically stacked monitoring and/or baiting devices for feeding by pests such as termites. The stackable, vertical arrangement of the invention provides a large volume of monitoring or baiting material to be present and can offer uninterrupted, undisturbed feeding starting at the time of station installation and continuing throughout the duration of the monitoring and/or controlling activities. If desired, upon installation of an in-ground pest monitoring or baiting station, two pest baiting devices absent toxicant or two monitoring devices 22 can be included in the station installation. Once installed and fed upon by termites, baiting can be initiated in any number of ways. For example, the device in the top chamber alone could be removed and replaced by a baiting device having a toxicant-containing matrix such as pest baiting apparatus 70. This allows for maintenance of an undisturbed termite harborage in the bottom chamber from which termites can migrate to access the newly installed baiting device. This could prove especially effective for successful baiting of what has been referred to above as "shy" termite species. In a variation of this arrangement, the top portion of the housing could be occupied by cup 90 which, following station installation and establishment of termite feeding on the bottom monitoring device, could be removed and replaced by a baiting device having a toxicant-containing matrix. Such a deployment could be especially useful in the monitoring and baiting of "shy" termite species because feeding in the top portion of the housing would be substantially precluded prior to baiting, thereby avoiding any interruption of feeding.

Alternatively, both the top and bottom monitoring devices could be removed and replaced by baiting devices comprising toxicant-containing matrix. This would represent delivery of a large volume of toxicant-containing bait in the station and could prove most useful under heavy feeding conditions where maintenance of uninterrupted feeding spanning the time between follow-up station inspections might otherwise be difficult.

Figure 4:
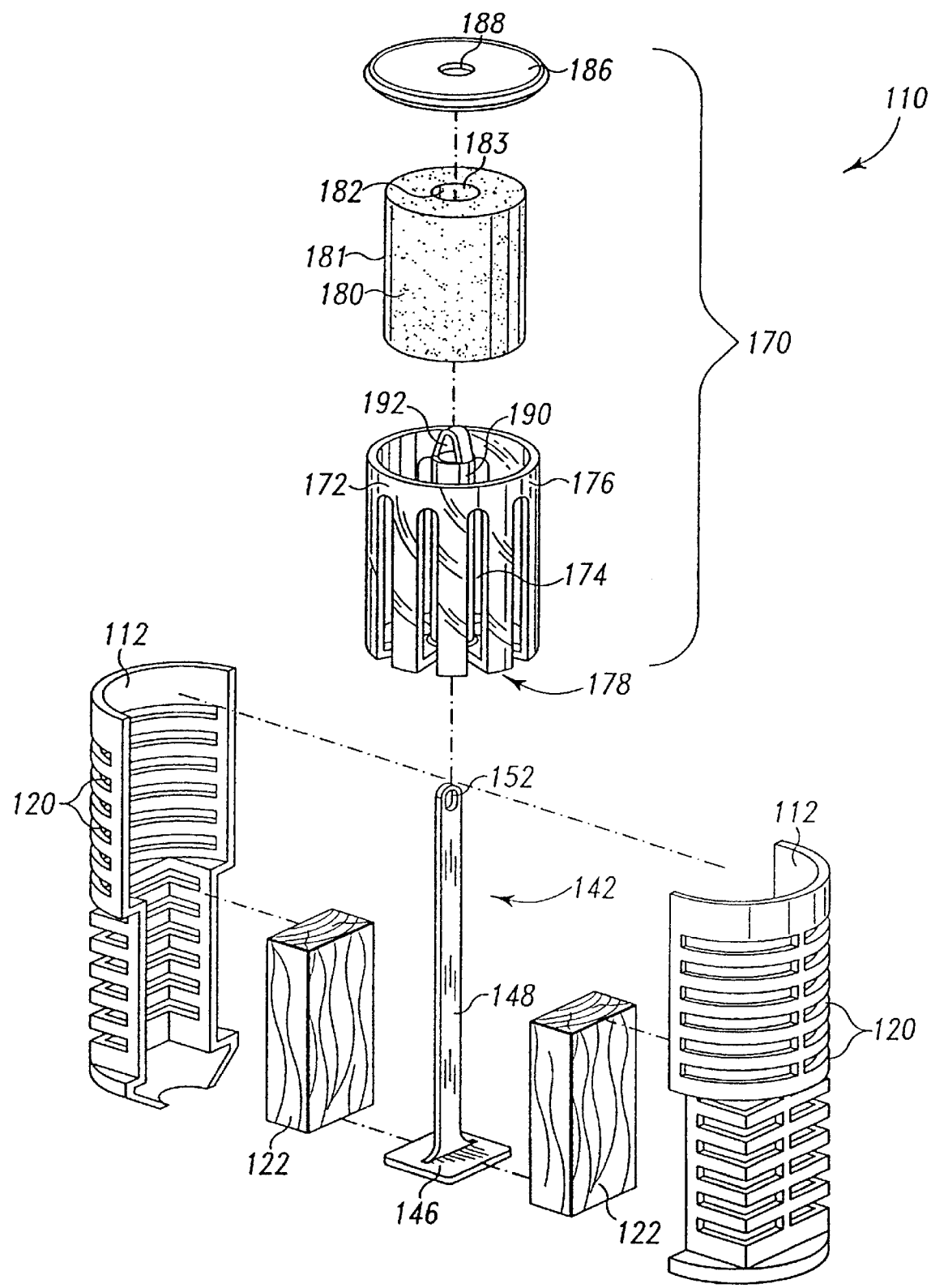
FIG. 4 is an exploded view of a pest monitoring or baiting station including one exemplary pest monitoring device and one exemplary pest baiting device.

Referring to FIG. 4, pest monitoring or baiting station 110 comprises a housing 112 which is somewhat similar to the housing of the first embodiment but comprises a rectangular lower portion and a cylindrical upper portion. Housing 112 includes apertures 120 for allowing termites to migrate to the interior of housing 112 from a location outside housing 112. Monitoring devices 122 in the form of generally rectangular wooden blocks can be provided. Extractor means 142 comprises a base 146, an elongated finger or member 148 preferably having a flattened bar shape which is compatible with the configuration of the two blocks comprising lower monitoring device 122, and a gripping means 152 which can take the form of an aperture located at or near the end of elongated member 148 opposite from base 146. As can be seen, in use, the two wooden blocks forming the lower monitoring device 122 are disposed adjacent to elongated member 148 and base 146 of extractor means 142. Although two blocks are shown, only one block or three or more blocks could alternatively be utilized provided the block or blocks are provided adjacent to elongated member 148 and base 146 of extractor means 142.

A pest baiting apparatus 170 is also shown in FIG. 4 and can comprise an outer cup or container 172 having apertures such as elongated slots 174 for permitting termite migration into the cup, sidewalls 176, a bottom 178, and a bottom opening (not shown) which is adapted to received extractor means 142 therein. Cup 172 can also comprise a center post 190 which can define in part the bottom opening of the cup. Preferably disposed at the top of center post 190 is a gripping means 192 which, for example, can be provided in a horseshoe shape having an aperture. Pest baiting device 180 can comprise an outer wall 181, an inner wall 183 defining a substantially enclosed channel 182 which is adapted to receive center post 190 of cup 172 for selectively moving the device 180, and a pest-edible material disposed between outer wall 181 and inner wall 183. A cap 186 for the pest baiting apparatus 170 can also be provided and can comprise an opening 188 which is adapted to receive gripping means 192 of cup 172. Cap 186 can be screwed onto cup 172 if both are provided with compatible threads, or cap 186 can otherwise be removably secured to cup 172 if desired. Alternatively, baiting apparatus 170 can be used without a cap.

Pest monitoring or baiting station 110 is utilized in a manner similar to the pest monitoring or baiting station 10. As is readily apparent from FIG. 4, one major difference between these two stations is that the lower monitoring blocks 122 do not form a substantially enclosed channel which is adapted to receive extractor means 142. Monitoring blocks 122 are simply moved by extractor means 142 when extractor means 142 is moved because these blocks are disposed on base 146 of extractor means 142. The top device in pest monitoring or baiting station 110 can be moved by actuating gripping means 192 of cup 172.

Pest baiting devices of the invention like pest baiting apparatuses 70 and 170 and pest baiting devices like pest baiting devices 80 and 180 can also be utilized alone without the need for an outer housing like housings 12 or 112 or in in-ground, on-ground, or above-ground housings or pest baiting stations. Pest baiting devices 80 and 180 and pest baiting apparatuses 70 and 170 can, for example, be directly positioned in an area to be monitored or treated for pests, such as in the ground, and the device or devices can be periodically monitored to determine whether any portion of the pest-edible material present therein has been consumed by pests. In addition, pest baiting devices 80 and 180 can be used with or without cups 72 or 172, respectively, in such applications. Further, if pest monitoring alone or combinations of pest monitoring and pest control are desired, one or more monitoring devices like monitoring devices 22 or 122 could also be used in such applications.

With respect to materials used in connection with the invention, the housings, top end flanges, top caps, extractor means, pest baiting cups and caps, and space filling cups are typically formed of durable materials which are preferably resilient, essentially non-biodegradable, and temperature and ultraviolet radiation degradation resistant, such as any of various well-known polymers, including various plastic materials such as polystyrene, as well as non-corrosive metals and wax.

The present invention contemplates a number of methods and apparatuses which may be readily utilized by one skilled in the art. Particular methods and apparatuses can be readily optimized for particular target pests and environmental settings using the teachings provided herein. It will be recognized that variations of these methods and apparatuses and their applicability to insects and pests other than termites would be readily recognized and used by a person skilled in this art. For instance, one of ordinary skill in the art will appreciate that the monitoring and baiting devices of the present invention, including the embodiments that comprise retaining cups, can be disposed in any sequential arrangement in the housing and the arrangements shown in the drawings are merely exemplary. The present invention, having been described in its preferred embodiments, is clearly susceptible to numerous modifications and embodiments within the ability of those skilled in the art and without the exercise of inventive faculty. The scope of the present invention is defined as set forth by the following claims.

What is claimed is:

1. A termite monitoring or baiting station comprising:
   (a) a termite-edible material;
   (b) a cup for holding the termite-edible material wherein the cup has openings sized to permit termites to pass through the openings so that termites can gain access to the termite-edible material from a location outside the cup and the cup contains a channel which is adapted to receive an extractor means;
   (c) an extractor means comprising a base and an elongated member projecting substantially perpendicularly therefrom adapted to be slidably received into the channel of the cup for selectively moving the cup; and
   (d) a housing adapted to removably receive the cup and the extractor means wherein the housing has openings sized to permit termites to pass through the openings so that termites can gain access to the interior of the housing from a location outside the housing.

2. The termite monitoring or baiting station of claim 1 wherein the cup is formed from a thermoplastic material.

3. The termite monitoring or baiting station of claim 2 wherein the cup is translucent or transparent.

4. The termite monitoring or baiting station of claim 1 wherein the termite-edible material comprises paper or a plurality of wooden blocks.

5. The termite monitoring or baiting station of claim 1 wherein the termite-edible material comprises a termiticide.

6. The termite monitoring or baiting station of claim 5 wherein the termiticide comprises hexaflumuron.

7. The termite monitoring or baiting station of claim 1 wherein the base comprises openings sized to permit termites to pass through the openings.

8. A termite monitoring or baiting station comprising:
a housing having openings sized to permit termites to pass through the openings so that termites can gain access to the interior of the housing from a location outside the housing; and
first and second devices adapted to be removably disposed within the housing in stacked relationship, wherein each of the first and second devices is selected from the group consisting of termite monitoring devices and termite baiting devices wherein at least one of the devices has disposed therein a channel which is adapted to receive an extractor means for selectively moving the device having said channel; and
an extractor means receivable into the channel of the device having said channel for selectively moving said device.

9. The termite monitoring or baiting station of claim 8 wherein the extractor means is slidably receivable into the channel.

10. The termite monitoring or baiting station of claim 9 wherein the extractor means comprises a base and an elongated member projecting substantially perpendicularly therefrom.

11. The termite monitoring or baiting station of claim 10 wherein the base comprises openings sized to permit termites to pass through the openings.

12. The termite monitoring or baiting station of claim 11 wherein at least one of the first or second devices comprises a cup for holding termite-edible material having openings sized to permit termites to pass through the openings.

13. The termite monitoring or baiting station of claim 8 wherein at least one of the first or second devices comprises a cup for holding termite-edible material having openings sized to permit termites to pass through the openings.

14. A termite monitoring or baiting station comprising:
(a) a housing having openings sized to permit termites to pass through the openings so that termites can gain access to the interior of the housing from a location outside the housing;
(b) a first device adapted to be removably disposed within the housing wherein the first device has disposed therein a channel which is adapted to receive an extractor means for selectively moving the device and is selected from the group consisting of termite monitoring devices and termite baiting devices;
(c) a first extractor means adapted to be received in the channel of the first device for use in selectively moving the first device; and
(d) a second device adapted to be removably disposed within the housing.

15. The termite monitoring or baiting station of claim 14 wherein the first extractor means comprises a base and an elongated member projecting substantially perpendicularly therefrom.

16. The termite monitoring or baiting station of claim 15 wherein the base comprises openings sized to permit termites to pass through the openings.

17. The termite monitoring or baiting station of claim 14 wherein the first and second devices comprise termite-edible material.

18. The termite monitoring or baiting station of claim 17 wherein the second device has disposed therein a channel which is adapted to receive an extractor means and further comprising a second extractor means adapted to be received in the channel of the second device for use in selectively moving the second device, and wherein the first and second extractor means are adapted to be substantially coaxially disposed in the housing to permit stacking of the first and second devices.

19. The termite monitoring or baiting station of claim 18 wherein the first extractor means comprises means for engaging the second extractor means.

20. The termite monitoring or baiting station of claim 18 wherein the second device comprises at least one wooden block disposed adjacent to the second extractor means.

21. The termite monitoring or baiting station of claim 20 wherein the second device consists essentially of two wooden blocks disposed adjacent to the second extractor means.

22. The termite monitoring or baiting station of claim 18 wherein at least one of the first or second devices comprises a cup for holding termite-edible material having openings sized to permit termites to pass through the openings.

23. The termite monitoring or baiting station of claim 22 wherein the cup is translucent or transparent and formed from a thermoplastic material.

24. The termite monitoring or baiting station of claim 17 wherein at least one of the first and second devices comprises a termiticide.

25. The termite monitoring or baiting station of claim 24 wherein both first and second devices comprise a termiticide.

26. The termite monitoring or baiting station of claim 14 wherein the second device is a space filling device comprising substantially transparent end caps, wherein the space filling device is substantially resistant to termite consumption.

27. The termite monitoring or baiting station of claim 26 wherein the space filling device comprises a gripping means for facilitating handling and movement of the space filling device.

28. The termite monitoring or baiting station of claim 14 wherein at least one of the first or second devices comprises a cup for retaining termite-edible material having openings sized to permit termites to pass through the openings.

29. A method for monitoring or controlling termites comprising the steps of:
providing a station comprising
(a) a housing having openings sized to permit termites to pass through the openings so that termites can gain access to the interior of the housing from a location outside the housing;
(b) a termite monitoring device or termite baiting device comprised of a cup holding a termite-edible material suitable for placement in the housing, said cup having openings sized to permit termites to pass through the openings and the cup having disposed therein a channel which is adapted to receive an extractor means for selectively moving the cup or for holding the cup in a pre-selected position; and
(c) an extractor means slidably received in the channel of the cup; and
periodically monitoring the station to determine whether any portion of the termite monitoring device or termite baiting device has been consumed by termites.

30. The method of claim 29 wherein the extractor means is used to maintain the position of the cup and is further used to selectively move a second termite monitoring device or termite baiting device.

31. The method of claim 30 wherein the cup has a gripping means for facilitating handling and movement of the cup.

32. The method of claim 29 wherein the extractor means is used to facilitate selective movement of the cup.

33. The method of claim 29 wherein the extractor means comprises a base and an elongated member projecting substantially perpendicularly therefrom.

34. The method of claim 33 wherein the base comprises openings sized to permit termites to pass through the openings.

35. A method for controlling termites comprising the steps of:

providing a termite baiting device compromised of a termite-edible material and toxicant, said termite baiting device having disposed therein a channel which is adapted to receive an extractor means for selectively moving the termite baiting device;

inserting into a housing having openings sized to permit termites to pass through the openings the termite baiting device and an extractor means that is received in the channel of the termite baiting device for selective movement of the termite baiting device; and exposing the termite baiting device to termites.

36. The method of claim 35 further comprising the step of periodically replacing the termite baiting device.

37. The method of claim 35 wherein the extractor means comprises a base and an elongated member projecting substantially perpendicularly therefrom.

38. The method of claim 37 wherein the base comprises openings sized to permit termites to pass through the openings.

39. A method for controlling termites comprising the steps of:

providing a termite monitoring device in an area where termite presence is to be determined, the termite monitoring device comprising a termite-edible material having disposed therein a channel which is adapted to receive an extractor means for selectively moving the device, a first extractor means slidably received within the channel for selectively moving the termite monitoring device;

periodically monitoring the termite monitoring device by checking for termite activity; and providing a termite baiting device in an area which is determined to contain termites, the termite baiting device comprising a termite-edible bait matrix having disposed therein a channel which is adapted to receive an extractor means for selectively moving the device, a slow-acting toxicant, and a second extractor means slidably received within the channel of the termite baiting device for selectively moving the termite baiting device.

40. The method of claim 39 further comprising the step of coupling the first and second extractor means.

41. The method of claim 39 wherein the slow-acting toxicant comprises hexaflumuron.

42. The method of claim 39 wherein each of the first and second extractor means comprises a base and an elongated member projecting substantially perpendicularly therefrom.

43. The method of claim 42 wherein the base of at least one extractor means comprises openings sized to permit termites to pass through the openings.

44. The method of claim 43 wherein the base of each extractor means comprises openings sized to permit termites to pass through the openings.

45. The method of claim 39 wherein the termite baiting device is provided within a retaining cup.

* * * * *